United States Patent
Kojima et al.

(10) Patent No.: US 7,254,473 B2
(45) Date of Patent: Aug. 7, 2007

(54) COMPRESSION IGNITION ENGINE CONTROL APPARATUS ENSURING DESIRED OUTPUT OF TORQUE

(75) Inventors: Akikazu Kojima, Gamagoori (JP); Hiroshi Haraguchi, Kariya (JP); Sumiko Norimoto, Kobe (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/605,475

(22) Filed: Nov. 29, 2006

(65) Prior Publication Data

US 2007/0119418 A1 May 31, 2007

(30) Foreign Application Priority Data

Nov. 29, 2005 (JP) ............................. 2005-343777

(51) Int. Cl.
*F02D 41/26* (2006.01)

(52) U.S. Cl. ...................... 701/105; 123/435; 123/295

(58) Field of Classification Search ................ 123/295, 123/435; 701/105
See application file for complete search history.

(56) References Cited

U.S. PATENT DOCUMENTS

| 6,209,515 B1 | 4/2001 | Gotoh et al. | |
|---|---|---|---|
| 6,722,345 B2 * | 4/2004 | Saeki et al. | 123/435 |
| 7,000,596 B2 * | 2/2006 | Zurloye et al. | 123/435 |
| 7,013,865 B2 * | 3/2006 | Nagai et al. | 123/305 |
| 7,133,761 B2 * | 11/2006 | Ancimer | 701/103 |
| 2006/0064226 A1 * | 3/2006 | Damitz et al. | 701/103 |
| 2006/0064230 A1 * | 3/2006 | Damitz et al. | 701/105 |
| 2007/0021901 A1 * | 1/2007 | Yamaguchi et al. | 701/105 |

FOREIGN PATENT DOCUMENTS

JP 2000-130224 5/2000

* cited by examiner

*Primary Examiner*—Erick Solis
(74) *Attorney, Agent, or Firm*—Nixon & Vanderhye P.C.

(57) ABSTRACT

An engine control apparatus for a multi-cylinder compression ignition internal combustion engine includes a combustion status sensor and a controller. The combustion status sensor is installed in a selected one of cylinders of the engine. The controller works to sample an output from the combustion status sensor to determine a combustion status parameter and determine injection timings so as to bring the combustion status parameter into agreement with a target value. The controller also corrects the injection timing for at least one of the cylinders in which the combustion status sensor is not installed so that a combustion status parameter of the at least one of the cylinders lies on an advanced side of that of the one of the cylinders in which the combustion status sensor is installed, thereby avoiding the deterioration of quality of combustion of the fuel arising from a shift of the time of the ignition in the retarded direction from a desired time point.

9 Claims, 5 Drawing Sheets

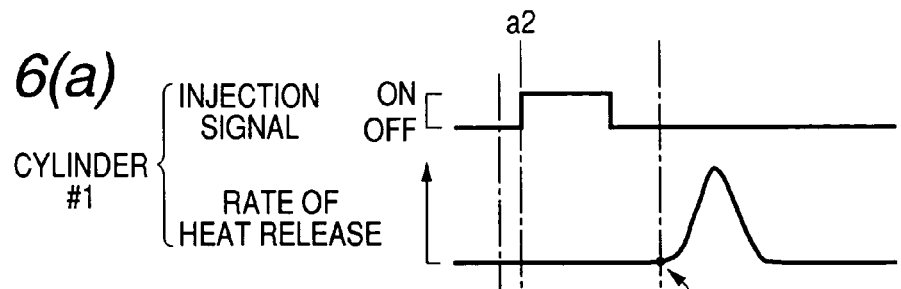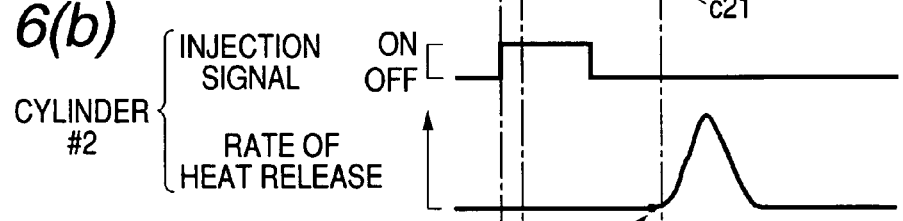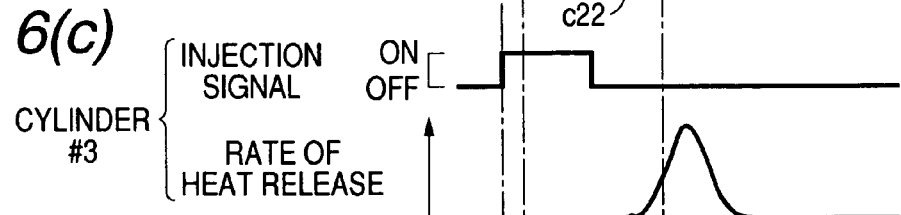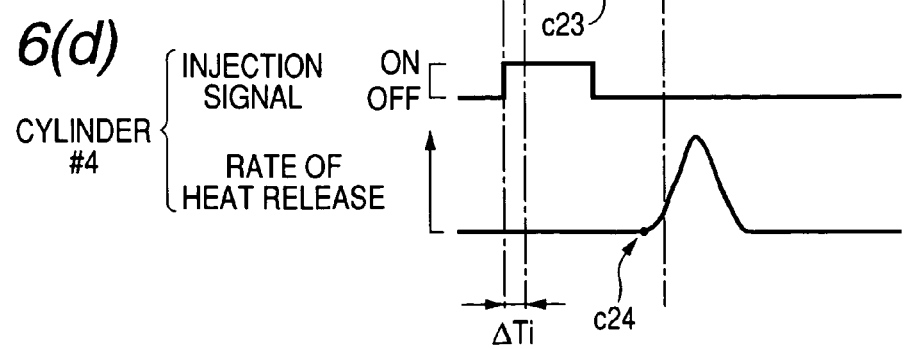

COMPRESSION IGNITION ENGINE CONTROL APPARATUS ENSURING DESIRED OUTPUT OF TORQUE

CROSS REFERENCE TO RELATED DOCUMENT

The present application claims the benefit of Japanese Patent Application No. 2005-343777 filed on Nov. 29, 2005, the disclosure of which is incorporated herein by reference.

BACKGROUND OF THE INVENTION

1 Technical Field of the Invention

The present invention relates generally to an engine control apparatus for multi-cylinder compression ignition internal combustion engine which is designed to correct injection timings based on the time of ignition of fuel in the engine.

2 Background Art

Typical multi-cylinder compression ignition internal combustion engines such as diesel engines have installed therein fuel injectors to inject fuel directly into cylinders thereof to produce combustible air-fuel mixture. Engine control systems for such a type of engines are usually designed to correct times of injection of the fuel into the cylinders (i.e. injection timings) based on the status of combustion of the engine in order to ensure desired levels of output of and quality of emissions from the engine. Specifically, the engine control systems work to sample an output from a combustion pressure sensor installed in the engine to determine an actual time of ignition of the fuel in the engine and correct the injection timings so as to bring the actual time of ignition into agreement with a target value.

Use of combustion pressure sensors in all the cylinders of the engine to correct the injection timings independently on a cylinder basis result in disadvantage in terms of cost. In order to alleviate this problem, there may be proposed systems which have a combustion pressure sensor installed only in one of cylinders of the engine to sample an actual time of ignition of fuel therein, determine the injection timing for the one of the cylinders so as to compensate for an ignition lag that is a difference between the actual time of ignition, as sampled, and a target time, and correct injection timings for the other cylinders based on the ignition lag under assumption that the other cylinders usually undergo the same ignition lag.

When the time of ignition of the fuel is retarded from some time point, it usually results in an undesirable drop in output from the engine. This is because the ignition of the fuel upon a drop in pressure in the cylinder results in a lack in utilizing combustion energy or a misfire in the course of combustion of the air-fuel mixture without adequate expansion thereof, leading to a reduction in the combustion energy.

In order to avoid the above problem, Japanese Patent First Publication No. 2000-130224 teaches an engine control system for internal combustion engines equipped with an EGR (Exhaust Gas Recirculation) system working to return or recirculate a portion of exhaust gas of the engine (i.e., EGR gas) into an intake pipe. The engine control system has a combustion pressure sensor installed in only one of cylinders of the engine which is the greatest in ratio of the amount of the EGR gas to the amount of intake air in the engine and works to determine and correct all target times of injection of fuel (i.e., injection timings) into the cylinders based on an actual time of ignition of the fuel, as determined using an output of the combustion pressure sensor. The engine control system is designed based on the fact that the one of the cylinders that is the greatest in the EGR gas-to-intake air ratio is apt to experience a misfire due to a drop in concentration of oxygen in the intake air arising form addition of the EGR gas thereto to correct the injection timings based on the actual time of the ignition in the one of the cylinders in which the combustion pressure sensor is installed to avoid the misfire.

However, fuel injectors have usually individual variability in injecting fuel into cylinders of the engine. A crank angle sensor has also individual variability in measuring the angular position of a crankshaft of the engine arising from manufacturing tolerances thereof. This will result in a variation in time of ignition of the fuel among the cylinders of the engine, which may lead to an undesirable shift of the times of ignition of the fuel in the cylinders in the regarded direction from a time point at which the quality of combustion of the fuel is deteriorated, resulting in a drop in torque, as produced by the engine.

SUMMARY OF THE INVENTION

It is therefore a principal object of the invention to avoid the disadvantages of the prior art.

It is another object of the invention to provide an engine control apparatus for a compression ignition internal combustion engine which is designed to control the status of combustion of fuel in all cylinders of the engine correctly based on a sampled combustion parameter indicating the status of combustion in a selected one of the cylinders.

According to one aspect of the invention, there is provided an engine control apparatus for a multi-cylinder compression ignition internal combustion engine such as a diesel engine which is designed to ensure the stability of combustion of fuel in all cylinder of the engine. The engine control system comprises: a combustion status sensor and a controller. The combustion status sensor is installed in a selected one of the cylinders of the engine equipped with injectors each of which injects fuel into a corresponding one of the cylinders. The combustion status sensor works to output a signal as indicating the state of combustion in fuel in the one of the cylinders. The controller works to sample the output from the combustion status sensor to determine a combustion status parameter representing one of a time of ignition of the fuel and a time of a preselected status of combustion of the fuel. The controller determines injection timings at which the injectors commence injection of the fuel into the cylinders so as to bring the combustion status parameter into agreement with a target value. The controller also corrects the injection timing for at least one of the cylinders that is other than the cylinder in which the combustion status sensor is installed so that a combustion status parameter representing one of a time of ignition of fuel in the at least one of the cylinders lies on an advanced side of that of the one of the cylinders in which the combustion status sensor is installed. The controller controls the injectors to initiate injection of the fuel into the cylinders at the injection timings. This avoids the deterioration of quality of combustion of the fuel arising from a shift of the time of the ignition in the retarded direction from a desired time point due to the factors, as described in the introductory part of this application.

In the preferred mode of the invention, the one of the cylinders in which the combustion status sensor is installed may be the latest in time of ignition of the fuel in the engine.

The controller corrects the injection timing for the at least one of the cylinders based on a predetermined variation in the combustion status parameter among the cylinders.

The controller may correct the injection timing for the at least one of the cylinders so that it is advanced from that of the one of the cylinders in which the combustion status sensor is installed by the predetermined variation in the combustion status parameter among the cylinders.

The controller may be designed to correct the ignition timings for ones of the cylinders in which the combustion status sensor is not installed so that combustion status parameters representing times of ignition of fuel in the ones of the cylinders lie on the advanced side of that of the one of the cylinders in which the combustion status sensor is installed. The degrees to which the ignition timings are corrected may be selected to be constant, respectively, on a cylinder basis.

The controller may change a degree to which the injection timing for the at least one of the cylinders is corrected as a function of an operating condition of the engine.

Only when a given condition of combustion in the engine is met, the controller may correct the injection timing for at least one of the cylinders.

The controller may work to control combustion of the fuel in the engine selectively in a first combustion mode where the fuel is burned at a lower concentration of oxygen in the cylinders and a second combustion mode where the fuel is burned at a higher concentration of oxygen in the cylinders. The given condition is when the engine is in the second combustion mode.

The one of the cylinders of the engine in which the combustion status sensor may be installed is the greatest in ratio of an amount of a portion of exhaust gas, as recirculated by an exhaust gas recirculation device into the cylinders, to an amount of air charged into the cylinders in the engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 6(a), 6(b), 6(c), and 6(d) are views which show relations between injection timings, as determined and corrected by the program of FIG. 5, and rates of heat release in first to fourth cylinders of an engine, respectively.

DESCRIPTION OF THE PREFERRED EMBODIMENTS

Figure 1:
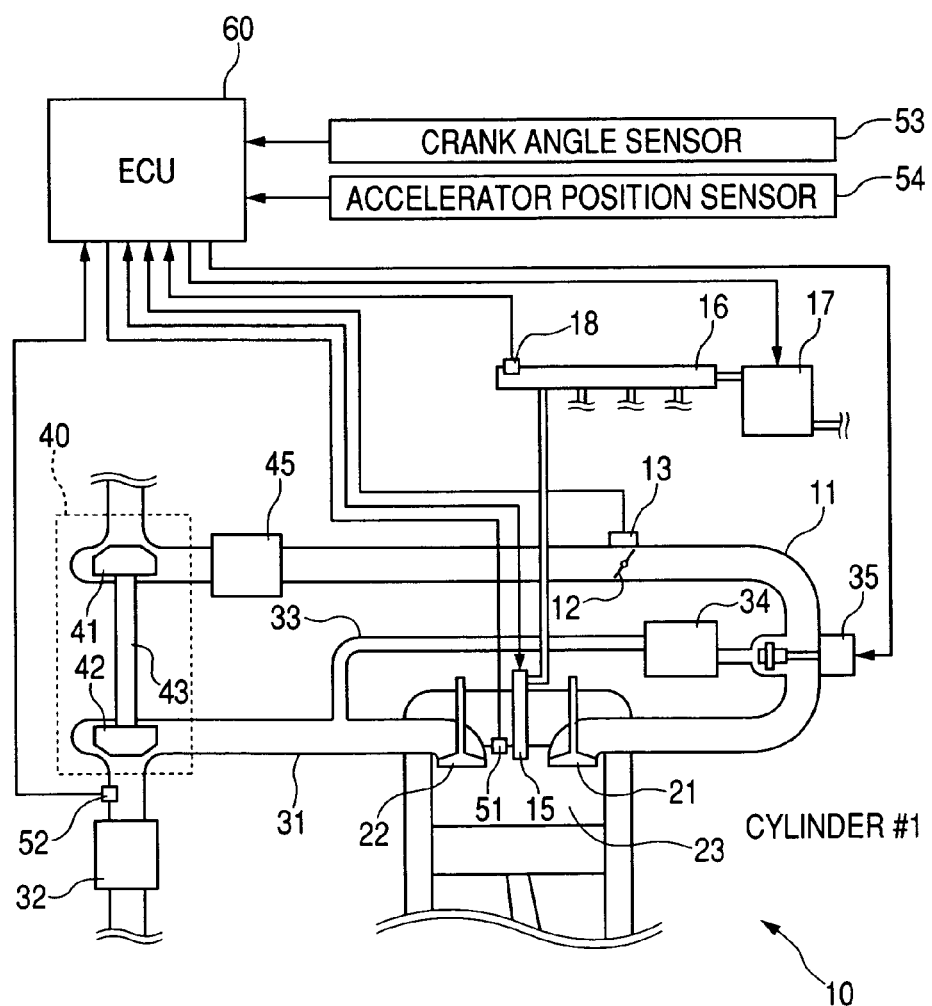
FIG. 1 is a view which shows an engine control system for compression ignition internal combustion engines according to the invention.

Referring to the drawings, wherein like reference numbers refer to like parts in several views, particularly to FIG. 1, there is shown an engine control system according to the invention which is constructed by an electronic control unit (ECU) 60 to control the ignition of fuel into an internal combustion engine 10. The internal combustion engine 10, as referred to herein, is, for example, a four-cylinder diesel engine. The engine control system is used with a common rail fuel injection system.

The engine 10 connects with an intake pipe 11 in which a throttle valve 12 and a throttle position sensor 13 are installed. The throttle valve 12 is moved in a valve position thereof by an actuator such as a dc motor. The throttle position sensor 13 works to measure the valve position (i.e., an open position) of the throttle valve 12 and output a signal indicative thereof to the ECU 60. The intake pipe 11 extends to an intake manifold downstream of the throttle valve and leads to each cylinder of the engine 10.

The engine 10 has installed therein injectors 15 each for one of the cylinders thereof. The injectors 15 connect with a common rail 16. The common rail 16 connects with a high-pressure pump 17. When actuated, the high-pressure pump 17 pumps fuel out of a fuel tank (not shown) and feeds it to the common rail 16 in which the fuel is accumulated at a selected high pressure at all times. A common rail pressure sensor 18 is installed in the common rail 16 and works to measure the pressure of the fuel within the common rail 16 to output a signal indicative thereof to the ECU 60.

The engine 10 also has an intake valve 21 and an exhaust valve 22 which are installed in an intake port and an exhaust port of each of the cylinders thereof. When the intake valve 21 is opened, air is charged into a combustion chamber 23 and mixed with the fuel sprayed by the injector 15 so that it is burned at a controlled timing. After the mixture is burned, the exhaust gas is emitted to an exhaust pipe 31 upon opening of the exhaust valve 22. A diesel particulate filter (DPF) 32 is installed in a downstream portion of the exhaust pipe 31 to trap particulate matter contained in the exhaust gas.

The engine 10 also has connected thereto an EGR (Exhaust Gas Recirculation) device working to recirculate a portion of the exhaust gas (will also be referred to as EGR gas below) into the intake pipe 11. The EGR device is made up of an EGR pipe 33, an EGR cooler 34, and an EGR valve 35. The EGR pipe 33 extends to connect between a portion of the intake pipe 11 located downstream of the throttle valve 12 and the exhaust pipe 31. The EGR cooler 34 is installed in the EGR pipe 33 to cool the EGR gas flowing through the EGR pipe 31. The EGR valve 35 is installed in a joint of the EGR pipe 33 and the intake pipe 11. The EGR 35 is actuated by the ECU 60 to control the amount of the EGR gas to be recirculated to the intake pipe 11. The EGR gas is mixed with the air in the intake pipe 11 to decrease the combustion temperature in each cylinder of the engine 10 to reduce the amount of NOx to be contained in the exhaust gas.

Disposed between the intake pipe 11 and the exhaust pipe 31 is a turbocharger 40 which is made up of a compressor impeller 41 exposed inside the intake pipe 11, a turbine wheel 42 exposed inside the exhaust pipe 31, and a rotary shaft 43 connecting the compressor impeller 41 and the turbine wheel 42 together. The turbine wheel 42 is rotated by the flow of exhaust gas within the exhaust pipe 31, which is then transmitted to the compressor impeller 41 through the rotary shaft 43, so that the compressor impeller 41 rotates to compress the air flowing through the intake pipe 11. The compressed air is cooled by the inter-cooler 45 and the charged into the cylinders of the engine 10. Use of the turbocharger 40 results in an enhanced efficiency of charging the air into the engine 10.

The engine 10, as described above, has the four cylinders which will be expressed by #1, #2, #3, and #4 below. A combustion pressure sensor 51 is installed in the first cylinder #1 of the engine 10. The first cylinder #1 is the greatest in ratio of the amount of the EGR gas to the amount of the intake air in the engine 10 depending upon the configuration of the intake pipe 11. The engine control system also includes an air-fuel ratio sensor 52, a crank angle sensor 53, and an accelerator position sensor 54. The air-fuel ratio sensor 52 works to measure the concentration of oxygen (O$_2$) contained in the exhaust gas from the engine 10 and output a signal indicative thereof to the ECU 60. The crank angle sensor 53 works to output a rectangular crank angle signal at given angular intervals (e.g., 30° CA) of a crank shaft of the engine 10 to the ECU 60. The accelerator position sensor 54 works to measure a driver's effort on or position of an accelerator pedal (not shown) and output a signal indicative thereof to the ECU 60.

The ECU 60 is implemented by a typical microcomputer consisting essentially of a CPU, a ROM, a RAM, etc. and works to execute engine control programs, as stored in the ROM, to perform a fuel injection control task, etc., based on instant operating conditions of the engine 10 which are monitored by the throttle position sensor 13, the common rail pressure sensor 18, the combustion pressure sensor 51, the air-fuel ratio sensor 52, the crank position sensor 53, and the accelerator position sensor 54.

The ECU 60 samples an output of the combustion pressure sensor 51 to determine the ignition timing in the first cylinder #1 of the engine 10. Specifically, the ECU 60 analyzes the output of the combustion pressure sensor 51 to calculate the volume of the combustion chamber 23 of the first cylinder #1 which is changed by vertical movement of the piston of the first cylinder #1 and determine the rate of heat release in the first cylinder #1 based on the calculated volume and the pressure in the first cylinder #1, as measured by the combustion pressure sensor 51. When the rate of heat release exceeds a given reference value, the ECU 60 determines the instant as the ignition timing for the first cylinder #1.

The engine 10 operates in two combustion modes. In the first combustion mode is a normal combustion mode in which the injectors 15 spray the fuel into the combustion chambers 23 of the cylinders when highly compressed, so that the fuel is ignited in the cylinders in sequence. The second combustion mode is a pre-mixed combustion mode in which each of the injectors 15 sprays the fuel at an early stage of the intake stroke or compression stroke of the piston where the pressure in the combustion chamber 23 is relatively low, so that the fuel is mixed with the charged air without being ignited until the combustion chamber 23 is highly compressed. The pre-mixed combustion mode may alternatively be a mode in which each of the injectors 15 sprays the fuel near the TDC (Top Dead Center), and a large amount of the EGR gas is circulated to the intake pipe 11 to retard the ignition of the mixture to prevent the ignition from occurring during the injection of the fuel into the cylinder. The ECU 60 is designed to switch between the first and second combustion mode upon a change in engine operating range defined by the speed of and load on the engine 10. Specifically, the ECU 60 selects the second combustion mode (i.e., the pre-mixed combustion mode) in a low-speed range or a low-load range of the engine 10 and the first combustion mode (i.e., the normal combustion mode) in other engine operating ranges.

Figure 2:
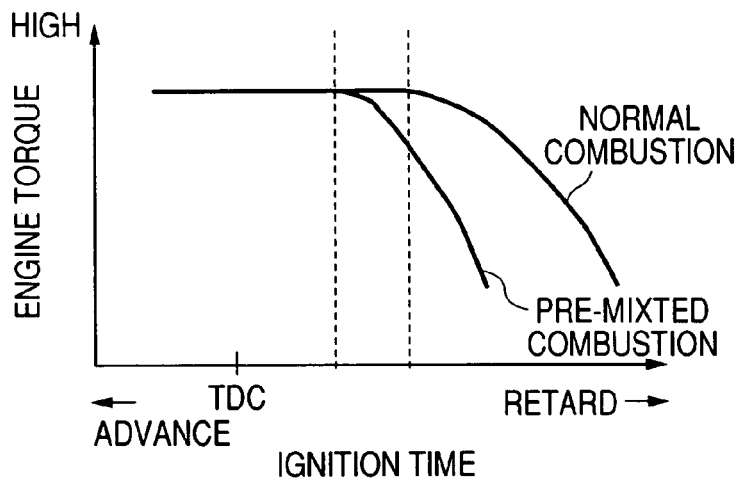
FIG. 2 is a graph which demonstrates a relation between engine torque and ignition timing.

FIG. 2 illustrates a relation between the ignition timing and torque, as produced by the engine 10. The graph shows that when the ignition timing is on the advance side of some time point, the engine 10 produces substantially a constant torque either in the normal combustion mode or the pre-mixed combustion mode, but the torque drops as the ignition timing is advanced from that time point. This arises from the fact that the ignition of the mixture at the time when the cylinder pressure (i.e., the pressure in the combustion chamber 23) drops will result in a lack in utilizing combustion energy or a misfire in the course of combustion of the combustion gas mixture without adequate expansion thereof, leading to reduced combustion energy. The normal combustion mode and the pre-mixed combustion mode are different in time point when the engine torque drops. Specifically, the time when engine torque is produced in the pre-mixed combustion mode lies on the advanced side of that in the normal combustion mode. Within a range where the engine torque is dropping, the amount of drop of the engine torque per the degree to which the ignition timing is retarded in the pre-mixed combustion mode is greater than that in the normal combustion mode.

Figure 3A:
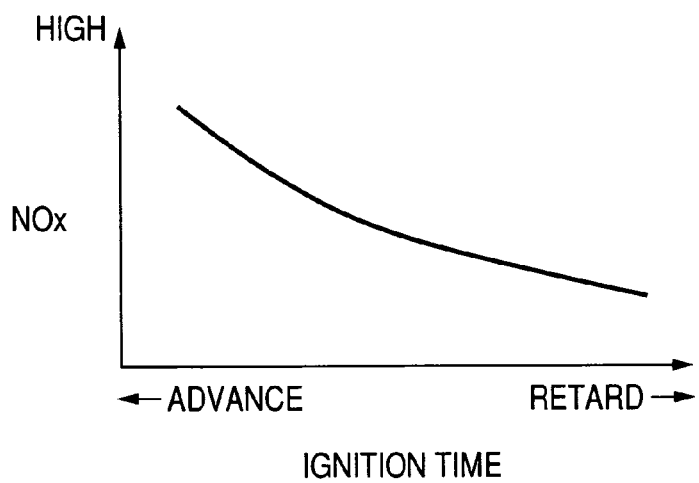
FIG. 3(a) is a graph which demonstrates a relation between the amount of NOx contained in exhaust emissions from an engine and the ignition timing of fuel in the engine.
Figure 3B:
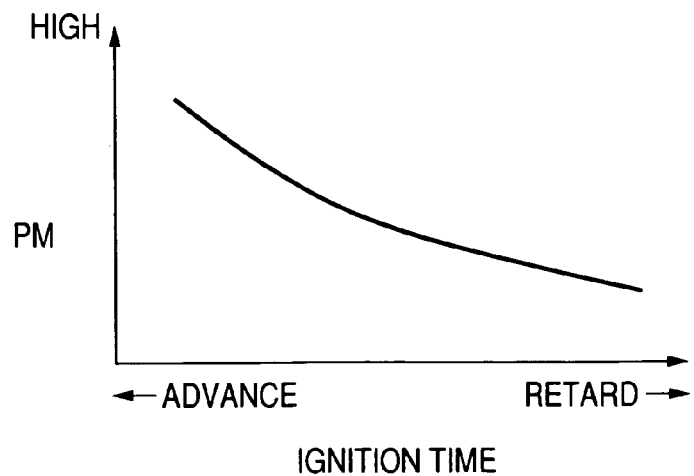
FIG. 3(b) is a graph which demonstrates a relation between PM (particulate matter) contained in exhaust emissions from an engine and the ignition timing of fuel in the engine.
Figure 4A:
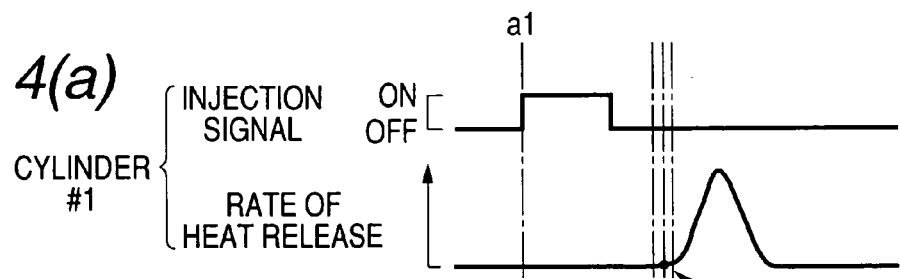
FIGS. 4(a), 4(b), 4(c), and 4(d) are views which show relations between injection timings and rates of heat release in first to fourth cylinders of an engine, respectively.
Figure 4B:
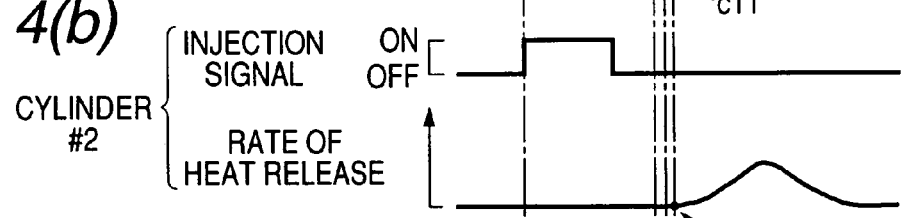
Figure 4C:
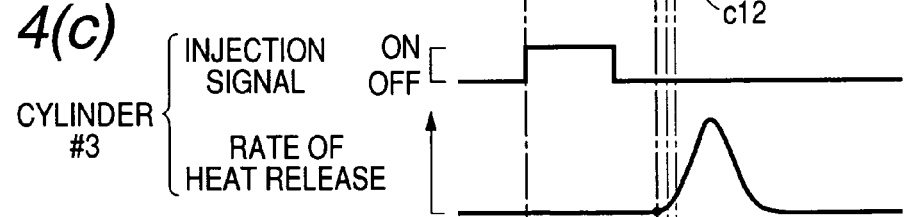
Figure 4D:
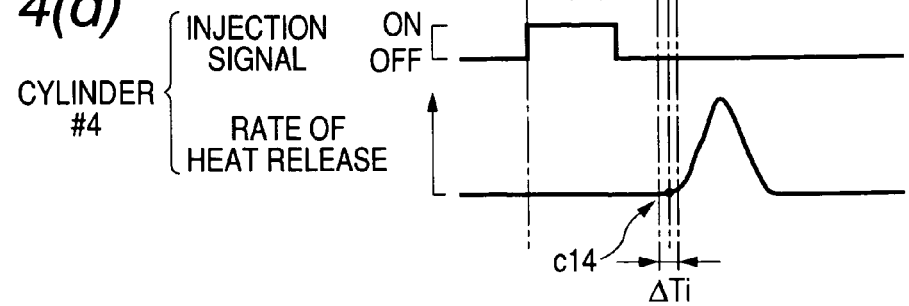

FIGS. 3(*a*) and 3(*b*) demonstrate relations between the amount of NOx emissions contained in the exhaust gas and the ignition timing in the normal combustion mode and between the amount of PM (Particulate Matter) contained in the exhaust gas and the ignition timing in the normal combustion mode, respectively. The graphs show that the amounts of NOx and PM emissions decrease as the ignition timing is retarded.

The graphs of FIGS. 2, 3(*a*), and 3(*b*) show that in the pre-mixed combustion mode, the injection timing (i.e., the start of injection of the fuel into the engine 10) is preferably so determined that the mixture may start to ignite just before the time point at which the engine torque starts to drop in order to ensure proper engine torque and quality of exhaust emissions.

Usually, the injectors 15 have individual variability in injection of the fuel. The crank angle sensor 53 has also individual variability in measuring the angular position of the crankshaft of the engine 10 arising from manufacturing tolerances thereof. Further, the engine 10 undergoes a variation in combustion of the fuel arising from a difference in configuration of the cylinders thereof. This may result in a variation in time when the mixture starts to ignite between the cylinders of the engine 10 even when the ECU 60 commands all the injectors 15 to inject the fuel into the engine 10 at the same timings on the basis of the injection timing determined for a specified one of the cylinders. Therefore, when the ECU 60 determines the injection timing for the first cylinder #1 in which the combustion pressure sensor 51 is installed and matches the injection timings for all the other cylinders #2 to #4 with that of the first cylinder #1, it may cause the mixture to start to actually ignite later in a retard direction than a target time point in each of the cylinders #2 to #4, thus resulting in a drop in torque output of the engine 10.

FIGS. 4(*a*) to 4(*d*) demonstrate a variation in actual ignition timing among the cylinders #1 to #4 of the engine 10. The injection timing for the first cylinder #1 in which the combustion pressure sensor 51 is installed is so determined that the injection timing thereof may fall within a range where there is no drop in the engine torque. Specifically, the injection timing of the first cylinder #1 is set to time a1. The actual time of ignition in the first cylinder #1 appears at time c11. When the injection timings for the cylinders #2 to #4 in which the combustion pressure sensor 51 is not installed are all set to the same time (i.e., time a1) as that for the first cylinder #1, it will result in shifts in actual ignition timing to times c12, c13, and c14, respectively. The times c13 and c14 of ignition in the third and fourth cylinders #3 and #4 are shifted to the advanced side of the time c11 of ignition in the first cylinder #1, while the time c12 of ignition in the second cylinder #2 is shifted to the retard side of the time c11 of ignition in the first cylinder #1. This causes the time c12 of ignition in the second cylinder #2 to fall in the range where the engine torque drops, which leads to a undesirable change in the rate of heat release in the second cylinder #2. A difference between the time c13 on the most advanced side and the time c12 on the most retarded side, that is, a maximum variation in ignition timing among the cylinders #1 to #4 is an time interval $\Delta Ti$ which will be referred to an ignition time difference below.

Figure 5:
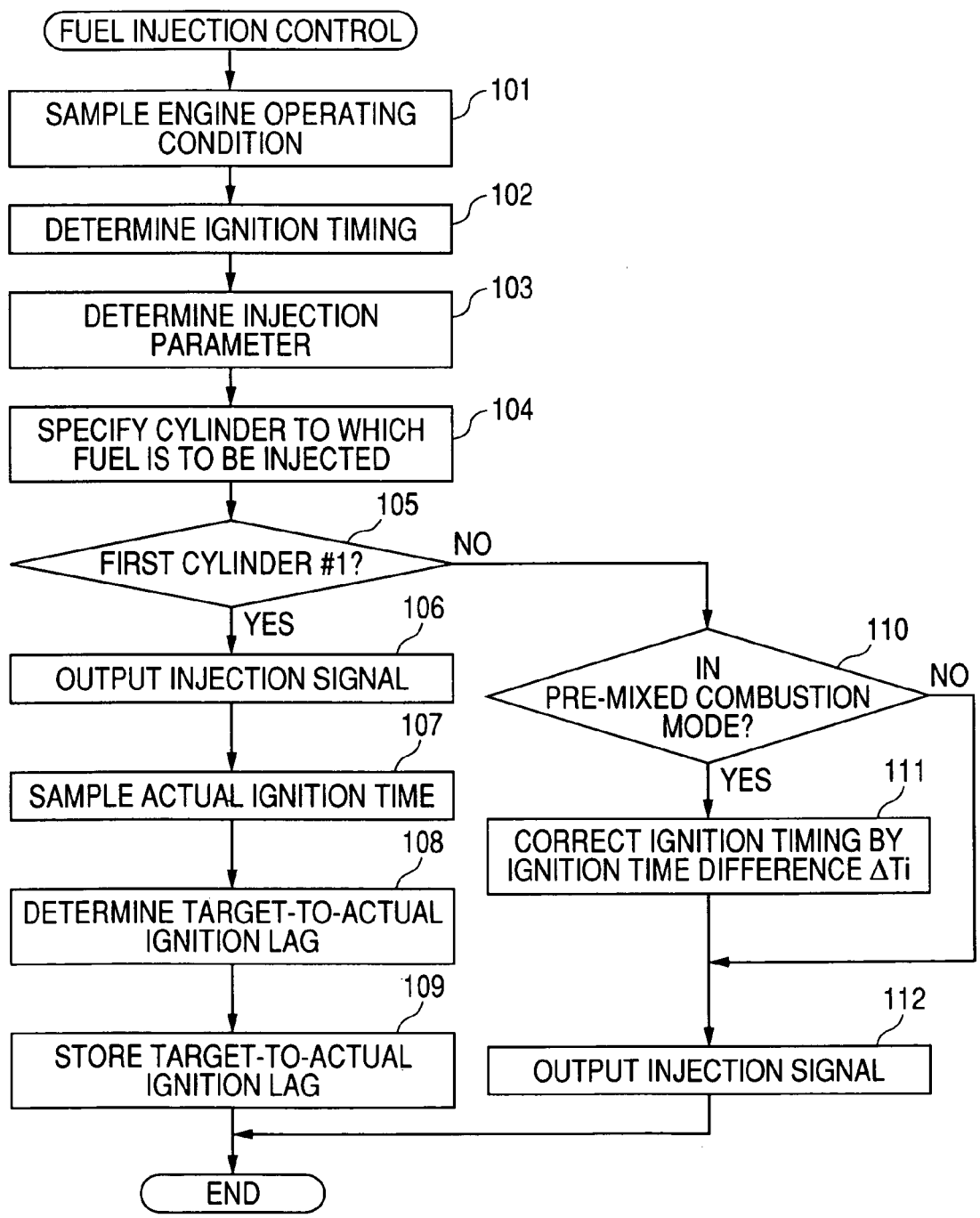
FIG. 5 is a flowchart of a program to determine and correct injection timings in an engine.

In order to alleviate the above problem, the ECU 60 is designed to correct the time (i.e., the injection timing), at which each of the injectors 15 starts to spray the fuel into a corresponding one of the cylinders #2 to #4 in which the combustion pressure sensor 51 is not installed, in the advanced direction by the ignition time difference $\Delta Ti$ which is on the order of 0.5° to 1.0° crank angle (CA) in this embodiment. The ignition time difference a $\Delta Ti$ may be found experimentally in advance FIG. 5 is a flowchart of a sequence of logical steps or program to be executed in a given cycle by the ECU 60 to control the time of injection of fuel into each of the cylinders #1 to #4 of the engine 10 so as to compensate for the ignition time difference a $\Delta Ti$.

After entering the program, the routine proceeds to step 101 wherein the speed of the engine 10 and the position of the accelerator pedal are sampled as indicating the operating conditions of the engine 10 from outputs of the crank angle sensor 53 and the accelerator position sensor 54.

The routine proceeds to step 102 wherein target injection timings are determined based on the operating conditions of the engine 10, as derived in step 101, in a known manner using, for example, a map table. The routine proceeds to step 103 wherein injection timings Ts for the cylinders #1 to #4 are determined as injection parameters which compensate for a target-to-actual ignition lag that is a difference between a target time and an actual time of ignition of the mixture in the first cylinder #1. The target-to-actual ignition lag is pre-stored in the RAM of the ECU 60. When this cycle of execution of the program is the second or subsequent cycle, the value of the target-to actual ignition lag which is, as described later, found and stored in the RAM one cycle earlier is used. The rate of injection and injection period are also determined as injection parameters.

The routine proceeds to step 104 wherein one of the cylinders #1 to #4 of the engine 10 to which the fuel is to be injected in this program cycle is specified. The routine proceeds to step 105 wherein it is determine whether the one of the cylinders #1 to #4, as specified in step 104, is the first cylinder #1 in which the combustion pressure sensor 51 is installed or not based on the output from the crank angle sensor 53 indicating the angular position of the crankshaft of the engine 10. If a YES answer is obtained meaning that the one of the cylinders #1 to #4 to which the fuel should now be injected is the first cylinder #1, then the routine proceeds to step 106. Alternatively, if a NO answer is obtained, then the routine proceeds to step 110.

In step 106, an injection signal achieving the injection parameters: injection timing Ts, the rate of injection, and the injection period, as derived in step 103, is outputted to a corresponding one of the injectors 15 to commence the injection of fuel into the first cylinder #1.

The routine proceeds to step 107 wherein the output of the combustion pressure sensor 51 is sampled to determine an actual time of ignition of the fuel into the first cylinder #1. The routine proceeds to step 108 wherein the target-to-actual ignition time lag that is a difference between the target ignition timing, as derived in step 102, and the actual ignition timing, as derived in step 107, is determined. The routine proceeds to step 109 wherein the target-to-actual ignition lag is stored in the RAM of the ECU 60. The routine then terminates.

If a NO answer is obtained meaning that the one of the cylinders #1 to #4, as specified in step 105, is not the first cylinder #1, then the routine proceeds to step 110 wherein it is determined whether the injection timings Ts for the cylinders #2 to #4 in which the combustion pressure sensor 51 is not installed should be corrected or not. Specifically, it is determined whether the engine 10 is now in the pre-mixed combustion mode or not which is to be entered, as described above, when the engine 10 is in the low-speed or low-load range. When the engine 10 is determined to be now placed in the pre-mixed combustion mode, a YES answer is obtained meaning that the injection timings Ts for the cylinders #2 to #4 should be corrected, then the routine proceeds to step 111 wherein the injection timings Ts are corrected or advanced by the ignition time difference $\Delta Ti$.

After step 111 or if a NO answer is obtained in step 110, then the routine proceeds to step 112 wherein injection signals achieving the injection parameters: injection timing Ts, as corrected in step 111, the rate of injection, and the injection period, as derived in step 103, are outputted to corresponding ones of the injectors 15 to commence the injection of fuel into the cylinders #2 to #4, in sequence. The routine then terminates.

FIGS. 6(a) to 6(d) demonstrate actual times of the ignition of fuel into the first to fourth cylinders #1 to #4 of the engine 10 under the injection timing control, as described in step 5.

The injection timing for the first cylinder #1 in which thee combustion pressure sensor 51 is installed is, as described above, determined to have the actual timing of injection thereof fall within the range where there is no drop in the engine torque. Specifically, the injection timing of the first cylinder #1 is set to time a2. The actual time of ignition in the first cylinder #1 appears at time c21. The injection timings for the cylinders #2 to #4 in which the combustion pressure sensor 51 is not installed are shifted in the advanced direction from the time a2 of the first cylinder #1 by the ignition time difference $\Delta Ti$ that is, as described above, the maximum variation in ignition timing among the cylinders #1 to #4. Actual times c22 to c24 of the ignition fuel into the second to fourth cylinders #2 to #4 are, therefore, advanced from the time c21 of the ignition of fuel into the first cylinder #1. It is found that all the times c21 to c24 of the ignition of fuel into the first to fourth cylinders #1 to #4 fall within the range where there is no drop in torque, as produced by the engine 10.

As apparent from the above discussion, the engine control system is designed to correct the injection timings Ts for ones of the cylinders of the engine 10 in which the combustion pressure sensor 51 is not installed (i.e., the second to fourth cylinders #2 to #4) to a time point that is advanced from that for one of the cylinders in which the combustion pressure sensor 51 is installed (i.e., the first cylinder #1), thereby eliminating the undesirable lag of the ignition which leads to the drop in the engine torque.

The combustion pressure sensor 51 is, as described above, mounted in the first cylinder #1 which is the greatest in ratio of the amount of the EGR gas to the amount of the intake air in the engine 10, thereby enabling the ECU 60 to minimize the delay of ignition of the mixture in the engine 10 which will result in a drop in the engine torque.

The ECU 60 may alternatively be designed to determine the degree to which the injection timing Ts are to be corrected or advanced to ensure a desired level of torque, as produced by the engine 10, based on a given time point during combustion of the mixture in each of the cylinders of the engine 10 correlating to the time of the ignition, such as the position or time of the peak of the rate of heat release, the combustion center of gravity, or the end of the combustion period instead of the variation in ignition timing among the cylinders of the engine 10.

The ECU 60 works to correct the injection timings Ts when the engine 10 is in the pre-mixed combustion mode, but may also be designed to make such a correction during an HCCI (Homogeneous Charge Compression Ignition) mode or a low-temperature combustion mode which is apt to result in a drop in torque of the engine 10 when the time of ignition is advanced from a desired point. Further, in the case where the engine control system is used with automobiles equipped with a NOx catalyst system, the ECU 60 may correct the injection timings Ts in a rich-burn control mode to purge the exhaust gas of NOx through the NOx catalyst system.

Use of fuel which is lower in cetane number in the normal combustion mode may cause the ignition timing to be retarded, thus resulting in a drop in engine torque. The ECU 60 may, therefore, also be designed to determine whether the value of the rate of heat release is correct or not during the normal combustion and, when it is incorrect, correct the injection timings Ts based on the ignition time difference $\Delta Ti$.

The ECU 60 may also be designed to multiply the ignition time difference $\Delta Ti$ by a predetermined constant $\alpha$ to correct the ignition timings Ts. For instance, the constant $\alpha$ is selected to be greater than one (1) in order to minimize the possibility that the time of ignition of the mixture in each of the second to fourth cylinders #2 to #4 is undesirably regarded from a desired point. The constant $\alpha$ may alternatively be selected to be smaller than one (1) to correct the injection timings Ts to the retard of those without use of the constant $\alpha$.

The ECU 60 may also be designed to change the degree to which the injection timings Ts for the second to fourth cylinders #2 to #4 (i.e., the ignition time difference $\Delta Ti$) are advanced as a function of parameters representing operating conditions of the engine 10 such as the ratio of the amount of EGR gas to that of air charged into the engine 10 and/or the concentration of oxygen ($O_2$) contained in the exhaust gas of the engine 10. For instance, the degree of which the injection timings Ts is to be corrected in the advanced direction may be increased with an increase in the EGR gas-to-air ratio. This is because an increase in the ratio of the amount of the EGR gas (i.e., the exhaust gas) to that of the intake air will result in a decrease in amount of oxygen contained in the intake air, thus causing the time of ignition of the mixture in the engine 10 to be retarded. Additionally, the degree of the correction may be increased in the advanced direction with a decrease in the concentration of oxygen in the exhaust gas. This is because usually, a decrease in concentration of oxygen in the exhaust gas causes the time of ignition of the mixture in the engine 10 to be retarded.

The combustion pressure sensor 51 is, as described above, installed in the first cylinder #1 which is the greatest in ratio of the amount of the EGR gas to the amount of the intake air in the engine 10 to correct the injection timings Ts for all the other cylinders #2 to #4, but however, it may be mounted in another cylinder to correct the ignition timing(s) Ts for only one or some of the other cylinders which are relatively greater in the ratio of the EGR gas-to-intake air ratio. It is usually possible to find such a cylinder(s) in advance from the configuration of the intake pipe 11. Specifically, the ECU 60 may work to correct or advance the injection timing(s) Ts for only one(s) of the cylinders of the engine 10 which is apt to experience misfire due to the addition of the EGR gas to the intake air.

In the case where the engine 10 is designed to have two banks, two combustion pressure sensors 51 may be installed one in one of cylinders of each of the banks. The ECU 60 works to correct the injection timings Ts for only one or some of the other cylinders of each of the banks which are relatively greater in the ratio of the EGR gas-to-intake air ratio.

Two or more combustion pressure sensors 51 may be installed in the cylinders of the engine 10. In this case, the ECU 60 works to correct the injection timings Ts based on actual times of ignition of the mixture, as sampled by the combustion pressure sensors 51.

In place of the combustion pressure sensor 51, the ECU 60 may use a combustion light sensor sensitive to emission of light upon combustion of the mixture to determine an actual time of ignition of the mixture in a specified one of the cylinders.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An engine control apparatus for a multi-cylinder compression ignition internal combustion engine comprising:
a combustion status sensor installed in a selected one of cylinders of a compression ignition internal combustion engine equipped with injectors each of which works to inject fuel into a corresponding one of the cylinders, said combustion status sensor working to output a signal as indicating a state of combustion in fuel in the one of the cylinders; and
a controller working to sample the output from said combustion status sensor to determine a combustion status parameter representing one of a time of ignition of the fuel and a time of a preselected status of combustion of the fuel, said controller determining injection timings at which the injectors commence injection of the fuel into the cylinders so as to bring the combustion status parameter into agreement with a target value, said controller also correcting the injection timing for at least one of the cylinders that is other than the cylinder in which said combustion status sensor is installed so that a combustion status parameter representing one of a time of ignition of fuel in the at least one of the cylinders lies on an advanced side of that of the one of the cylinders in which said combustion status sensor is installed, said controller controlling the injectors to initiate injection of the fuel into the cylinders at the injection timings.

2. An engine control apparatus as set forth in claim 1, wherein the one of the cylinders in which said combustion status sensor is installed is the latest in time of ignition of the fuel in the engine.

3. An engine control apparatus as set forth in claim 1, wherein said controller corrects the injection timing for the at least one of the cylinders based on a predetermined variation in the combustion status parameter among the cylinders.

4. An engine control apparatus as set forth in claim 3, wherein said controller corrects the injection timing for the at least one of the cylinders so that it is advanced from that of the one of the cylinders in which said combustion status sensor is installed by the predetermined variation in the combustion status parameter among the cylinders.

5. An engine control apparatus as set forth in claim 1, wherein said controller corrects the ignition timings for ones of the cylinders in which said combustion status sensor is not installed so that combustion status parameters representing times of ignition of fuel in the ones of the cylinders lie on the advanced side of that of the one of the cylinders in which said combustion status sensor is installed, and wherein degrees to which the ignition timings are corrected are selected to be constant, respectively, on a cylinder basis.

6. An engine control apparatus as set forth in claim 3, wherein said controller changes a degree to which the injection timing for the at least one of the cylinders is corrected as a function of an operating condition of the engine.

7. An engine control apparatus as set forth in claim 1, wherein only when a given condition of combustion in the engine is met, said controller corrects the injection timing for at least one of the cylinders.

8. An engine control apparatus as set forth in claim 7, wherein the controller works to control combustion of the fuel in the engine selectively in a first combustion mode where the fuel is burned at a lower concentration of oxygen in the cylinders and a second combustion mode where the fuel is burned at a higher concentration of oxygen in the cylinders, and wherein the given condition is when the engine is in the second combustion mode.

9. An engine control apparatus as set forth in claim 1, wherein the one of the cylinders of the engine in which said combustion status sensor is installed is the greatest in ratio of an amount of a portion of exhaust gas, as recirculated by an exhaust gas recirculation device into the cylinders, to an amount of air charged into the cylinders in the engine.

* * * * *